United States Patent [19]

Davidson

[11] Patent Number: 4,527,668
[45] Date of Patent: Jul. 9, 1985

[54] DISC BRAKE FRICTION PAD SUPPORT AND BIASING ASSEMBLY

[75] Inventor: Donald J. Davidson, Troy, Mich.

[73] Assignee: Rockwell International Corporation, Pittsburgh, Pa.

[21] Appl. No.: 528,298

[22] Filed: Aug. 31, 1983

[51] Int. Cl.³ .................... F16D 55/224; F16D 65/02
[52] U.S. Cl. .............................. 188/73.38; 188/73.45; 188/250 E
[58] Field of Search ............... 188/73.38, 73.37, 73.36, 188/73.34, 73.33, 73.32, 73.31, 71.1, 73.43–73.45, 205 A, 250 E, 250 F, 250 B, 73.1, 72.3, 72.4–72.6, 216, 73.35

[56] References Cited

U.S. PATENT DOCUMENTS

| | | | |
|---|---|---|---|
| 2,968,370 | 1/1961 | Ruet | 188/73.38 X |
| 3,642,101 | 2/1972 | Hauth | 188/73.38 |
| 3,677,372 | 7/1972 | Burnett | 188/205 A X |
| 3,677,373 | 7/1972 | Lucien | 188/73.38 X |
| 4,276,965 | 7/1981 | Pickel | 188/73.35 |
| 4,335,806 | 6/1982 | Lüpertz | 188/73.38 X |
| 4,352,414 | 10/1982 | Scott | 188/73.34 |
| 4,424,886 | 1/1984 | Frigger et al. | 188/73.35 |

Primary Examiner—Douglas C. Butler

[57] ABSTRACT

In a vehicle disc brake, a friction pad having a radially outer tab slidably supported on circumferentially spaced edges of a caliper aperture and biased against a force transmitting plate by a spring seated against the heads of fasteners secured to the force transmitting plate and having shanks extending through apertures in the backing plate tab which permit lateral movement of the friction pad relative to the force transmitting plate.

3 Claims, 8 Drawing Figures

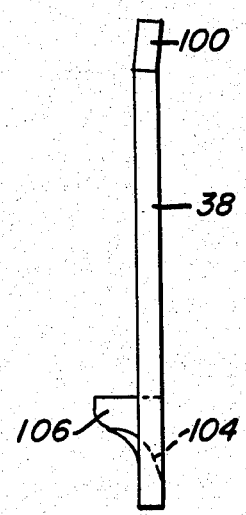
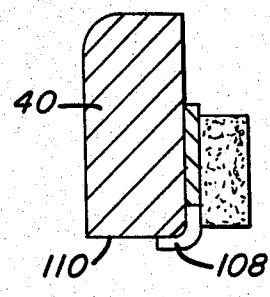
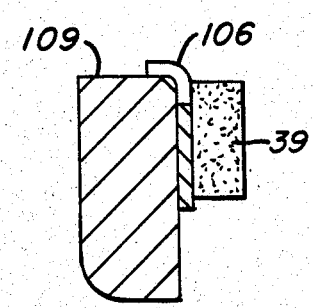

DISC BRAKE FRICTION PAD SUPPORT AND BIASING ASSEMBLY

BACKGROUND OF THE INVENTION

1. Field of the Invention

The present invention relates to a disc brake assembly and more specifically to an improved means for supporting friction pads in the disc brake assembly.

The present invention is particularly applicable to a disc brake assembly of the type disclosed in U.S. Pat. No. 4,406,352 issued Sept. 27, 1983. The brake includes a rotor or disc mounted for rotation with a vehicle wheel and a floating caliper straddling the periphery of the rotor. The caliper is usually mounted on a support or torque plate by means permitting movement of the caliper in an axial direction relative to the torque plate and rotor. Brake pads are carried by the caliper on opposite sides of the rotor and are movable into contact with oppositely disposed friction braking surfaces of the rotor by actuating means usually driven by a fluid motor. In a floating caliper disc brake, each friction pad is located intermediate one leg of the caliper and the adjacent friction surface of the rotor. The actuating mechanism is usually carried by one leg of the caliper and serves to move the friction pad adjacent to that leg axially into contact with the rotor, the reaction force of the contact serving to draw the other leg of the caliper and the other friction pad into contact with the opposite surface of the rotor.

2. Description of the Prior Art

Disc brake pads have been provided with projections or extensions in the form of tabs which serve to mount or support the disc brake pad for sliding movement relative to a caliper. Tabs have been provided at the circumferentially spaced edges of the brake pads to be slidably carried in grooves provided to the caliper. Supporting surfaces in the form of edges have been provided at the ends of brake pads and on tabs or projections provided to the brake pads to be slidably supported by complimentary edges provided to the disc brake caliper. Examples of such arrangements may be found in U.S. Pat. Nos. 3,942,612; 3,972,393 and 4,068,743. U.S. Pat. No. 4,352,414 discloses a friction pad having a supporting tab with radially converging edges slidably carried by circumferentially spaced, radially converging edges provided to a caliper aperture.

SUMMARY OF THE INVENTION

The present invention provides a vehicle disc brake including a rotor having oppositely disposed friction surfaces secured for rotation with a vehicle wheel, a caliper mounted to a support and having a leg depending adjacent one friction surface of the rotor. Actuating means including a force transmitting plate are disposed adjacent the other friction surface of the rotor and reaction abutment means are provided between the actuating means and the caliper. A first friction pad is disposed between the force transmitting plate and the other friction surface of the rotor with the radially outer portion of the friction pad supported by the caliper with said friction pad axially biased into contact with the force transmitting plate to prevent vibration of said friction pad.

In the preferred embodiment, the friction pad is supported by circumferentially spaced surfaces of a friction pad tab seated on circumferentially spaced edges of a caliper aperture, a pair of fasteners are secured at one end in threaded bores provided to the force transmitting plate, shanks of the fasteners extend through apertures provided through the friction pad tab and a spring seated between the other ends of said fasteners and said friction pad tab axially biases the friction pad against said force transmitting plate while radial clearance between said tab apertures and said fastener shanks permit the friction pad to move laterally relative to the force transmitting plate until one of the circumferentially spaced surfaces of the tab abuts one of the circumferentially spaced edges of the caliper aperture. The advantages offered by the present invention will become apparent from the following description of the embodiment shown in the accompanying drawings.

DESCRIPTION OF THE DRAWINGS

In the drawings, wherein like reference numerals refer to like parts:

FIG. 3 is a sectional view taken along line 3—3 of FIG. 1;

FIG. 5 is a plan view of the friction pad backing plate of FIG. 4;

FIG. 6 is a side elevation of the friction pad of FIG. 4;

DESCRIPTION OF THE INVENTION

Figure 1:
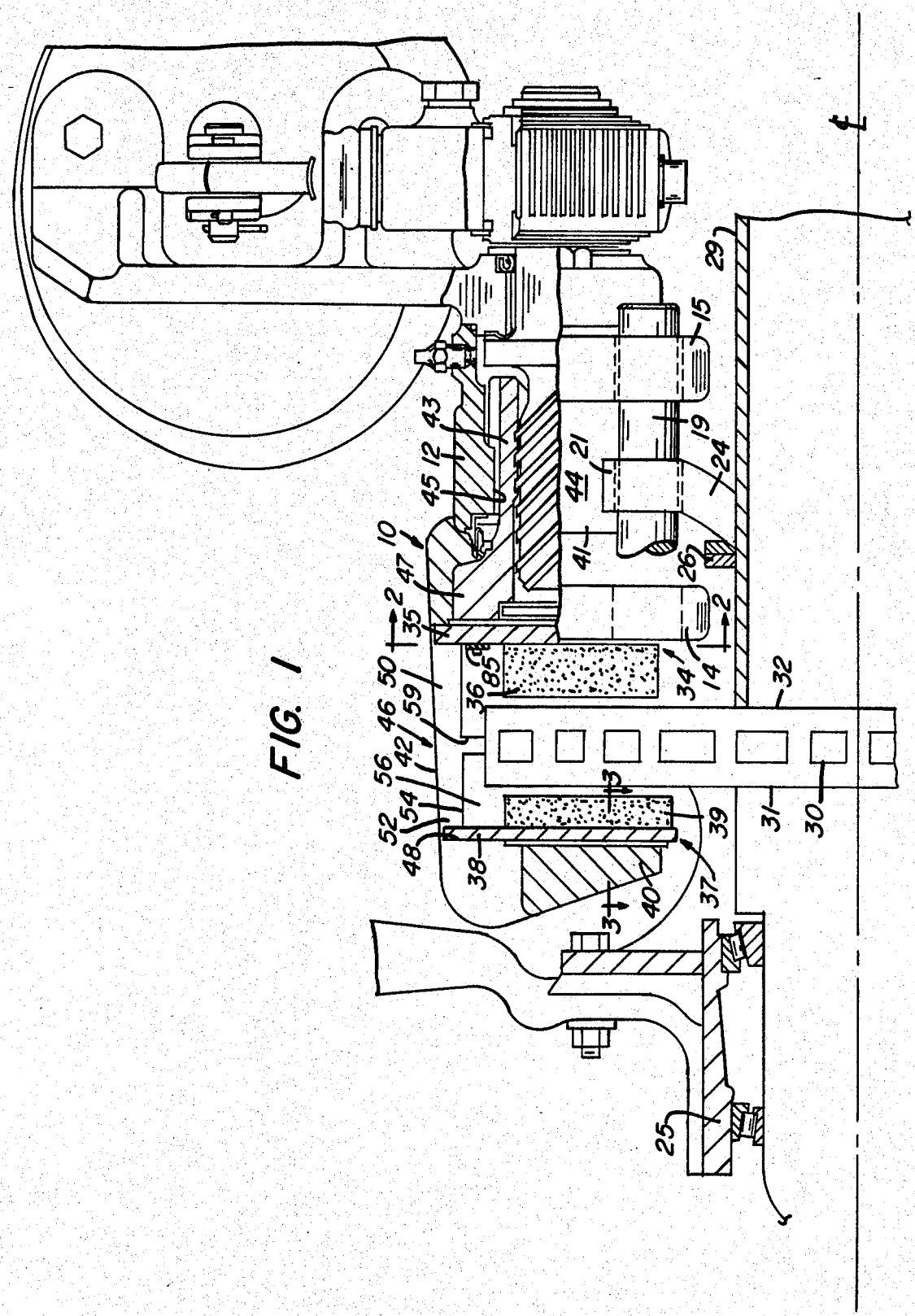
FIG. 1 is a front elevation of disc brake, partly in section incorporating the present invetion.

With reference to the drawings, FIG. 1 shows a disc brake assembly generally designated by the numeral 10. The assembly 10 includes a floating caliper 12 mounted by means of circumferentially spaced, axially aligned pairs of bosses 14 and 15, on slide pin 19 only one of which is shown. The slide pins are respectively secured within bores provided to a boss such as the boss at the radially outer extremities of circumferentially spaced, radially extending arms such as the arm 24, of a brake supporting torque plate of spider 26. The torque plate 26 is provided with a circular array of apertures which receive a plurality of bolts not shown which in turn secure the support to torque plate 26 to a flange welded to a vehicle axle 29. The torque plate 26 could of course be welded directly to the axle 29. A rotor 30 having axially spaced, radially extending, oppositely disposed friction braking surfaces 31 and 32 is secured for rotation with a wheel hub 25 carried by the vehicle axle 29 adjacent the disc brake assembly 10.

The caliper 12 is a cast metal component comprised of a depending leg 40 extending radially inward adjacent the friction surface 31 of rotor 30, an oppositely disposed depending leg or wall 41 adjacent the friction surface 32 of rotor 30 and a bridge 42 straddling the periphery of rotor 30 and joining the leg 40 to the wall 41. The wall 41 is formed with a generally cylindrical housing 44 having a bore 45 slidably mounting a piston 43 formed integrally with a load applying plate 47. The contour of the load plate 47 is similar to the contour of the backing plate 35 of the friction pad 34 and moves the pad 34 axially into contact with the rotor friction surface 31 in response to actuation of the brake assembly. The piston 43 and load plate 47 may be moved by suitable hydraulic or mechanical actuating means. A power screw and nut actuating mechanism similar to that disclosed in Application Ser. No. 212,000, filed Dec. 1, 1980 is illustrated in FIG. 1.

The bridge 42 of caliper 12 is provided with an aperture 46 defined by a radially disposed edge 48 and a pair of circumferentially spaced, axially extending, stepped edges 50 and 51. Stepped edge 50 is comprised of two surfaces 52 and 55 joined by a horizontal surface or step 54. Stepped edge 51 is comprised of two surfaces 56 and 59 joined by a horizontal surface or step 58. The circumferentially spaced stepped edges 50, 51 are each provided with a slot only of which slot 59 is shown in edge 50. The slots are located radially outward from the periphery of the rotor 30 and provide access means for friction pads to the caliper.

Figure 2:
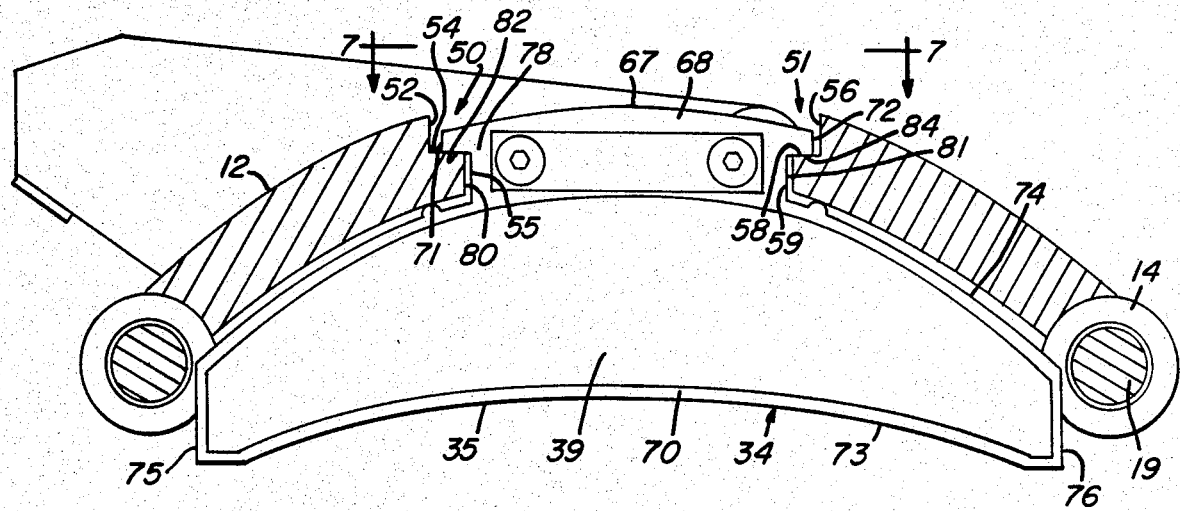
FIG. 2 is a sectional view taken along line 2—2 of FIG. 1.
Figure 4:
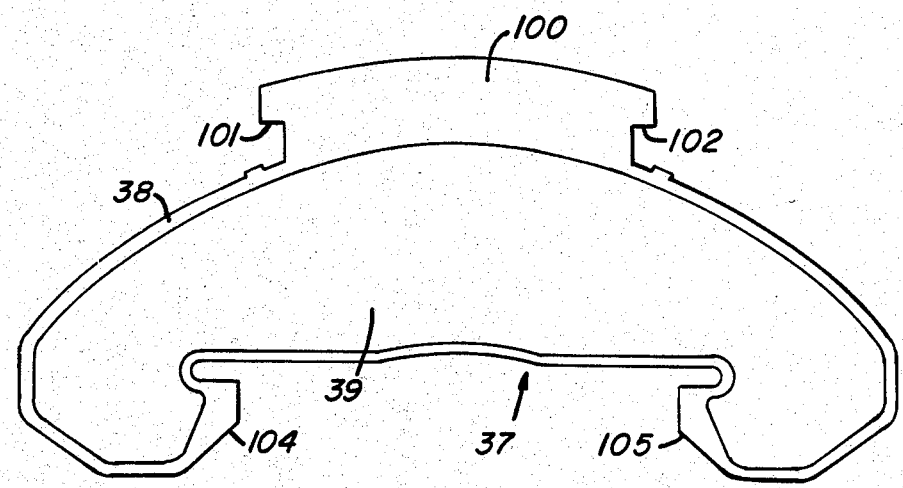
FIG. 4 is a view of a friction pad.

Friction pads 34, 37 are respectively comprised of backing plate 35, 38 with friction material 36, 39 secured thereto. The friction pad 34 as shown by FIG. 2 is comprised of a metal backing plate 35 of uniform thickness having friction material 36 secured to a major portion 70 of the backing plate. The major portion 70 is defined by arcuate longitudinal edges 73 and 74 joined by circumferentially spaced lateral edges 75 and 76. The arcuate edge 74 is of greater radius than the edge 73 and extends radially outward to provide a supporting tab 67 of substantial circumferential length less than the distance between the lateral edges 75, 76.

The supporting tab 67 is comprised of a radially outer head portion 68 laterally bounded by a pair of circumferentially spaced edges 71 and 72 and a neck portion 78 laterally bounded by a pair of circumferentially spaced edges 80 and 81. The distance between the edges 71 and 72 is greater than the distance between the edges 80 and 81. A surface 82 joins the edges 71 and 80. A surface 84 joins the edges 72 and 78. The surfaces 71, 80, 82 and 72, 81, 84 provide stepped recesses at each end of the tab 67 and the surfaces 82 and 84 provide supporting surfaces or shoulders at each end of the tab 67.

The surfaces 52, 54, 55 and 56, 58, 59 provide a stepped edge 50, 51 at each circumferentially spaced side of the caliper aperture 46.

The supporting shoulder 82 and the step 54 in edge 50 are wider or of greater circumferential length relative to the arc of the caliper bridge 12 than the supporting shoulder 84 and the step 58 in edge 51. The width of the shoulder 82 is about 11 centimeters and the width of the step 58 is only about 10 centimeters. The shoulder 82 can not be seated on the step 58 and this non-symmetry on the tab 67, i.e., the difference in the width of the shoulders 82, 84 and the steps 54, 58 prevents tab 67 and friction pad 34 from being improperly assembled to the stepped edges 50, 51.

Figure 7:
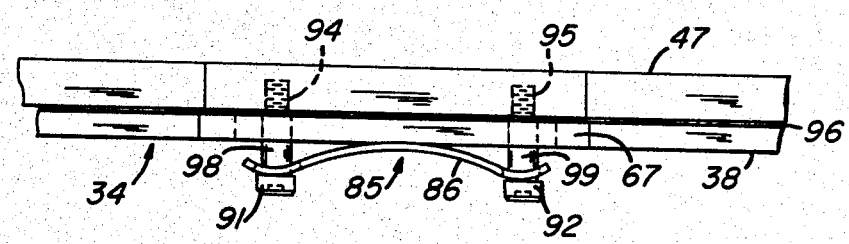
FIG. 7 is a sectional view taken along line 7—7 of FIG. 2.
Figure 8:
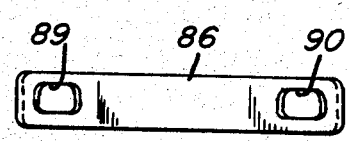
FIG. 8 is a front view of the spring of FIG. 7.

A spring assembly 85, as best shown by FIG. 7 is also provided to bias the friction pad 34 into contact with the froce transmitting load plate 47 and thereby prevent vibration of the metal backing plate.

The spring assembly is comprised of leaf spring 86 having a pair of apertures in the form of laterally extending slots 89, 90. A pair of fasteners 91 and 92 are secured in threaded bores 94 and 95 provided to the load plate 47. The fasteners are machine type bolts threaded at one end and having a shoulder and shank extending to a hexagonal socket head at the other end. A fastener 91 or 92 is provided to each aperture 89, 90 and threaded into the bores 94, 95 until the shoulder seats against the surface of the load plate 47. A sheet of vibration damping paper 96 is secured to the rear surface of the metal backing plate 35 and the spring 86 biases the paper backed surface of the friction pad 34 into non-vibrating contact with the load plate 47. The diameter of the fasteners shanks 98 and 99 and the width of the slot-type aperture 89, 90 is such as to permit lateral movement of the friction pad to enable the edges 80 and 81 of the tab 67 to abut the surface 55, 59 of the stepped edge 50, 51 and transfer braking torque to the caliper bridge 12.

Friction pad 37 is also supported by a generally T-shaped tab 100 and stabilized by engagment with the depending caliper leg 40 to prevent vibration of the friction pad backing plate. With reference to FIGS. 3-6, friction pad 37 is comprised of metal backing plate 38 of uniform thickness having friction material 39 secured to a major portion of one surface of the backing plate.

The friction pad tab 100 provides pairs of supporting surfaces or shoulders 101 and 102 which support the radially outer portion of the friction pad 37 on the steps 54 and 58 of the stepped edges 50 and 51.

The radially inner portion of the metal backing plate is die cut at 104 and 105 to provide a pair of arms 106 and 108, bent rearwardly to provide means stabilizing the friction pad 37 against vibration. During assembly, the tab 100 of friction pad 37 is seated on the stepped edges 50, 51 of the caliper apertures and, with reference to FIG. 3, the rearwardly extending legs 106 and 108 are seated with an interference fit against the axially spaced surfaces 109 and 110 of a central recess provided at the lower end of the depending caliper leg 40. The arms 106 and 108 prevent substantial movement and vibration of the radially inner portion of the friction pad 37.

The supporting surfaces 101 and 102 of the tab 100 are symmetrical since the rearwardly extending arms 101 and 108 will engage the rotor 30, if the friction pad is reversed when it is seated on the stepped edges 50, 51 and prevent the brake from being improperly assembled.

When necessary, the friction pads 34 and 37 may be readily installed or withdrawn by removing the slide pin 19 and pivoting the caliper 12 about the other slide pin. This movement of the caliper 12 withdraws the friction pads 34, 37 from their operative position adjacent the friction surfaces 31 and 32 of the rotor and enables the backing plate tabs 67, 100 to be slid axially along the stepped aperture edge surfaces 50, 51 into alignment with the access slots 59 thereby permitting radial withdrawal of the friction pads 34, 37 from their supporting relationship with the floating caliper 12. Replacement friction pads may be installed in the reverse manner. The tabs of the replacement friction pads are aligned with the access slots 59 and inserted into the caliper aperture 46 where the tabs are axially displaced into supporting relationship on the stepped aperture edges 50, 51 and spaced apart to permit the friction lining material to move across the oppositely disposed friction surfaces of the rotor. The biasing spring 86 is then secured by the fasteners 91 and 92 to the load plate 47 and the rearward extending arms 106, 108 of friction pad 37 are seated on the caliper leg recess surfaces 109 and 110. The caliper 12 is then pivoted back to align the bore of the caliper bosses 14 and 15 with the bore provided to the boss 21 of torque plate arms 24. The slide pin 19 is then replaced in the axially aligned bore of bosses 14, 15 and 21 and locked in position by suitable means.

The present invention thus provides a simple economical means for mounting disc brake friction pads to a caliper and means for biasing the friction pad into contact with other components to prevent vibration of the friction pad.

The invention may also be embodied in other specific forms without departing from thes pirit of essential characteristics thereof. The foregoing description is therefore to be considered as illustrative and not restrictive, the scope of the invention being defined by the appended claims and changes which come within the means and range of equivalency of the claims are therefore intended to be embraced thereby.

We claim:

1. A vehicle disc brake comprising a rotor having oppositely disposed friction surfaces secured for rotation with a vehicle wheel, a caliper slidably mounted to a support, said caliper having a leg depending adjacent one friction surface of said rotor, actuating means including a force transmitting plate adjacent the other friction surface of said rotor, reaction abutment means between said actuating means and said caliper, a first friction pad disposed between said force transmitting plate and said rotor, a second friction pad disposed between said depending caliper leg and said rotor, means supporting a radially outer tab of said first friction pad on said caliper, a fastener secured to a threaded bore in said force transmitting plate, said fastener having a shank projecting from said bore through an aperture in said radially outer tab of said first friction pad and terminating in a head, said aperture being greater in diameter than said fastener shank and a spring between said fastener head and said first friction pad biasing said first friction pad toward said force transmitting plate while permitting lateral movement of said first friction pad relative to said force transmitting plate.

2. A vehicle disc brake comprising a rotor having oppositely disposed friction surfaces mounted for rotation with a vehicle wheel, a caliper slidably mounted to a support, said caliper having a leg depending adjacent one friction surface of said rotor and an aperture in a bridge extending over the periphery of said rotor, actuating means including a force transmitting element adjacent the other friction surface of said rotor, a friction pad disposed between said force transmitting element and said other surface of said rotor, said friction pad having a radially outwardly extending tab bounded by two circumferentially spaced surfaces slidable on circumferentially spaced axially extending edges of said caliper aperture and a pair of circumferentially spaced abutment surfaces, a pair of apertures through said radially outwardly extending tab, a pair of fasteners with each fastener secured at one end to said force transmitting element and having a shank portion extending through one of said apertures through said radially outwardly extending tab, means between said radially outwardly extending tab of said friction pad and the other ends of said fasteners biasing said friction pad toward said force transmitting element and a clearance space between said fastener shanks and the walls of said apertures through said radially outwardly extending tab of said friction pad permitting said friction pad to move laterally relative to said force transmitting element and contact of either of said pair of circumferentially spaced abutment surfaces with an adjacent surface of said caliper.

3. The vehicle disc brake defined by claim 2 wherein said means biasing said friction pad toward said force transmitting element is a leaf spring.

* * * * *